US008951314B2

(12) United States Patent
Leininger et al.

(10) Patent No.: US 8,951,314 B2
(45) Date of Patent: Feb. 10, 2015

(54) FUEL FEED SYSTEM FOR A GASIFIER

(75) Inventors: Thomas Frederick Leininger, Chino Hills, CA (US); Aaron John Avagliano, Houston, TX (US); John Saunders Stevenson, Yorba Linda, CA (US); John Duckett Winter, Broomfield, CO (US)

(73) Assignee: General Electric Company, Schenectady, NY (US)

( * ) Notice: Subject to any disclaimer, the term of this patent is extended or adjusted under 35 U.S.C. 154(b) by 1147 days.

(21) Appl. No.: 12/209,711

(22) Filed: Sep. 12, 2008

(65) Prior Publication Data

US 2009/0107046 A1   Apr. 30, 2009

Related U.S. Application Data

(60) Provisional application No. 60/982,967, filed on Oct. 26, 2007.

(51) Int. Cl.
*C10J 3/30* (2006.01)
*F23G 5/02* (2006.01)
(Continued)

(52) U.S. Cl.
CPC . *F23G 5/02* (2013.01); *C10J 3/506* (2013.01); *F01K 23/068* (2013.01); *F23G 5/50* (2013.01); *C10J 2300/0903* (2013.01); *C10J 2300/0909* (2013.01); *C10J 2300/093* (2013.01); *C10J 2300/0959* (2013.01); *C10J 2300/0969* (2013.01); *C10J 2300/0973* (2013.01); *C10J 2300/0983* (2013.01); *C10J 2300/1606* (2013.01); *C10J 2300/1634* (2013.01); *C10J 2300/165* (2013.01); *C10J 2300/1671* (2013.01); *C10J 2300/1675* (2013.01); *C10J 2300/1678* (2013.01); *C10J 2300/169* (2013.01); *C10J 2300/1807* (2013.01); *Y02E 20/18* (2013.01); *Y02E 20/16* (2013.01); *Y10S 48/04* (2013.01); *Y10S 48/07* (2013.01)
USPC ............. 48/62 R; 48/73; 48/86 R; 48/DIG. 4; 48/DIG. 7

(58) Field of Classification Search
USPC ....... 48/62 R, 63, 73, 86 R, 202, 206, DIG. 2, 48/DIG. 3, DIG. 4, DIG. 7; 201/7, 8, 22; 110/224, 232
See application file for complete search history.

(56) References Cited

U.S. PATENT DOCUMENTS 3,414,480 A * 12/1968 Stotler et al. ..................... 201/15
3,775,071 A * 11/1973 Hoffert et al. .................. 48/210
(Continued)

OTHER PUBLICATIONS

International Search Report, PCT 08/81391, dated Jan. 5, 2009, pp. 2.

*Primary Examiner* — Jill Warden
*Assistant Examiner* — Joye L Woodard
(74) *Attorney, Agent, or Firm* — Armstrong Teasdale LLP

(57) ABSTRACT

A fuel feed system for use in a gasification system includes a feed preparation section, a pressurization and conveyance section, and a slag additive section. The feed preparation section is configured to grind the fuel to a predetermined size and to adjust the moisture content within the particulate fuel. The pressurization and conveyance section is coupled in flow communication with the feed preparation section, and includes at least one solids pump configured to receive a flow of the particulate fuel at a first pressure and discharge the particulate fuel at a second pressure. The slag additive section is configured to feed a slag additive mixture into the gasifier and to substantially control the total water content within the gasification system.

18 Claims, 4 Drawing Sheets

(51) Int. Cl.
*C10J 3/50* (2006.01)
*F01K 23/06* (2006.01)
*F23G 5/50* (2006.01)

(56) References Cited

U.S. PATENT DOCUMENTS

| | | | |
|---|---|---|---|
| 3,971,639 A * | 7/1976 | Matthews | 48/202 |
| 4,343,627 A | 8/1982 | Tanca | |
| 4,502,227 A | 3/1985 | Janusch | |
| 4,655,792 A * | 4/1987 | Kessler et al. | 48/DIG. 7 |
| 4,955,989 A | 9/1990 | Mink | |
| 4,988,239 A | 1/1991 | Firth | |
| 5,051,041 A | 9/1991 | Firth | |
| 5,125,931 A | 6/1992 | Schulz | |
| 5,381,886 A | 1/1995 | Hay | |
| 5,402,876 A | 4/1995 | Hay | |
| 5,485,909 A | 1/1996 | Hay | |
| 5,551,553 A | 9/1996 | Hay | |
| 5,560,550 A | 10/1996 | Krawczyk | |
| 5,657,704 A | 8/1997 | Schueler | |
| 5,953,899 A * | 9/1999 | Rao et al. | 60/781 |
| 6,048,374 A * | 4/2000 | Green | 48/209 |
| 6,213,289 B1 | 4/2001 | Hay et al. | |
| 6,773,630 B2 | 8/2004 | Stellaccio et al. | |
| 6,835,229 B2 | 12/2004 | Brown et al. | |
| 7,402,188 B2 * | 7/2008 | Sprouse | 48/77 |
| 7,762,200 B2 | 7/2010 | Fischer et al. | |
| 2005/0166810 A1 | 8/2005 | Gnedenko et al. | |
| 2007/0261616 A1 | 11/2007 | Engel | |
| 2009/0029299 A1 | 1/2009 | Fischer et al. | |

* cited by examiner

FUEL FEED SYSTEM FOR A GASIFIER

CROSS REFERENCE TO RELATED APPLICATIONS

This application claims priority to and the benefit of the filing date of U.S. Provisional Application No. 60/982,967 filed on Oct. 26, 2007, which is hereby incorporated by reference in its entirety.

BACKGROUND

The field of the disclosure relates generally to gasification, such as gasification used in Integrated Gasification Combined Cycle (IGCC) power generation systems, and more specifically to systems for supplying high moisture content, solid, carbonaceous fuels to gasifiers, and methods of start-up for such systems.

At least one known IGCC plant feeds a water-based slurry of bituminous coal to a refractory-lined, entrained flow gasifier to generate the fuel gas used in power generation. Such a slurry feed system may provide an economical and reliable option for feeding higher rank coals, such as bituminous and anthracite coals, to the gasifier. However, such a system is less attractive for lower rank coals, such as sub-bituminous coals, because of the difficulty surrounding the production of low rank coal slurries with a solids concentration and energy content high enough for efficient power production.

Inherent moisture is water trapped in the pores of the coal and therefore such moisture may not be available for making the coal slurry. Low rank coals have a relatively higher inherent moisture content (e.g. 22-30 wt %) than compared to high rank coals (e.g. <10 wt %). In known IGCC systems, producing coal-water slurry represents a physical process that includes suspending the coal particles in water to facilitate enabling the coal particles to freely move past one another, i.e. enabling slurry flow within the IGCC system. More specifically, in some known IGCC systems, water may be added in an amount sufficient to produce a slurry with a viscosity no higher than about 700 to 1000 Centipoise to enable the slurries to be screened, pumped and sprayed by the feed injectors. Coals with higher inherent moisture content naturally produce slurries with higher total water content. For example, coals with relatively higher inherent moisture content produce slurries with a lower solids content, i.e. lower energy content per unit volume of slurry. While water may be added to particulate sub-bituminous coal to produce a pumpable slurry, the energy content of the resulting dilute slurry may not reach an energy level capable of sustaining an efficient gasification operation.

In some known IGCC systems, the quantity of water needed to make a pumpable slurry far exceeds the amount of water needed for the reactions. Although some of the water does react with the coal and convert the coal to syngas, most of this excess slurry water passes through the gasifier, consuming some of the thermal energy in the reactor as the water heats up to reaction temperature, and then degrading that thermal energy produced in the gasifier to lower temperature levels as the product gas is cooled in downstream equipment. The extra energy required for heating the excess water to gasifier reaction temperature comes at the expense of burning some of the CO and $H_2$ in the product syngas to $CO_2$ and $H_2O$. This requires additional oxygen to be fed to the gasifier, which decreases efficiency and increases capital cost. Also, by converting some of the CO and $H_2$ in the product syngas to $CO_2$ and $H_2O$ in order to heat up the excess water, the amount of CO and $H_2$ produced per unit of coal gasified decreases. Therefore, in order to fuel the power block with a fixed amount of CO and $H_2$, the syngas components with fuel value, a larger amount of coal must be gasified when feeding a coal slurry compared with feeding coal in a much drier state. This increased coal requirement both decreases the plant efficiency and increases its capital cost.

Some known combustion turbines must burn a fixed amount of carbon monoxide and hydrogen to achieve their maximum rated power production. To produce the required amount of CO and $H_2$, a plant feeding a dilute slurry of sub bituminous coal must gasify significantly more coal than a plant feeding a slurry of bituminous coal. Such a sub-bituminous coal plant may be both less efficient and more costly to construct and operate.

Some known IGCC systems feed high moisture content coal to gasifiers using a system known as a dry feed system to overcome the difficulty of producing a high energy content slurry and to avoid the negative impact on overall plant efficiency. In such a dry feed system, lower rank coals may be dried to remove two-thirds, or more, of the inherent moisture present in the coal. The deep drying facilitates improving the flow characteristics of the dried solids in the dry feed system equipment as well as improving the overall efficiency of the gasifier. For instance, high levels of drying are often needed to help reduce the potential consolidation and subsequent flow problems that can result during pressurization of higher moisture content solids in a lock hopper. However, drying the coal may consume a large amount of energy, which reduces the overall power production of the plant as a result. In addition, the dry feed system equipment, which may include a compressor, lock hoppers, lock hopper valves, drying equipment and additional storage capacity, results in a relatively expensive system when compared with slurry-based systems. Furthermore, such systems are limited to relatively modest pressures, on the order of 400 psig or less, because the consumption of gas used for lock hopper pressurization and particle fluidization increases dramatically as system pressures increase.

SUMMARY

In one aspect, a fuel feed system for use in a gasification system is provided, wherein the fuel feed system includes a feed preparation section, a pressurization and conveyance section, and a slag additive section. The feed preparation section is configured to adjust a moisture content within a particulate fuel and grind the fuel to a predetermined size. The pressurization and conveyance section is coupled in flow communication with the feed preparation section, and includes at least one solids pump configured to receive a flow of the particulate fuel at a first pressure and discharge the particulate fuel at a second pressure. The slag additive section is configured to feed a slag additive mixture into the gasifier and substantially control a total water content within the gasification system as well as the melting and flow characteristics of the particulate fuel ash.

In another aspect, a gasification system is provided that includes a gasifier, and a fuel feed system coupled in flow communication upstream of the gasifier. The fuel feed system includes a feed preparation section, a pressurization and conveyance section, and a slag additive section. The feed preparation section is configured to adjust a moisture content within a particulate fuel and grind the fuel to a predetermined size. The pressurization and conveyance section is coupled in flow communication with the feed preparation section, and includes at least one solids pump configured to receive a flow of the particulate fuel at a first pressure and discharge the particulate fuel at a second pressure. The slag additive section is configured to feed a slag additive mixture into the gasifier and substantially control a total water content, and further control melting and flow characteristics of a quantity of particulate fuel ash within the gasification system within the gasification system.

In yet another aspect, a method of start-up for a gasification system is provided. The method includes using a startup fuel, for example coal conveyed by nitrogen or natural gas, and a startup mixture of slag additive slurry, both of which are replaced following gasifier startup. The flow rates of the startup fuel and the slag additive slurry are both established in circulation loops external to the gasifier prior to startup. Gasifier startup is initiated by channeling the startup fuel, slag additive slurry and oxygen into the gasifier in a defined sequence and in such a way that a heat source within the gasifier rapidly ignites the gasification reactions. Once gasification operations have stabilized and CO2 is recovered from the syngas, the startup fuel is replaced with CO2-conveyed coal, and the startup mixture of slag additive slurry is replaced with a slurry of slag additive and recycled fine slag and char.

DETAILED DESCRIPTION

Figure 1:
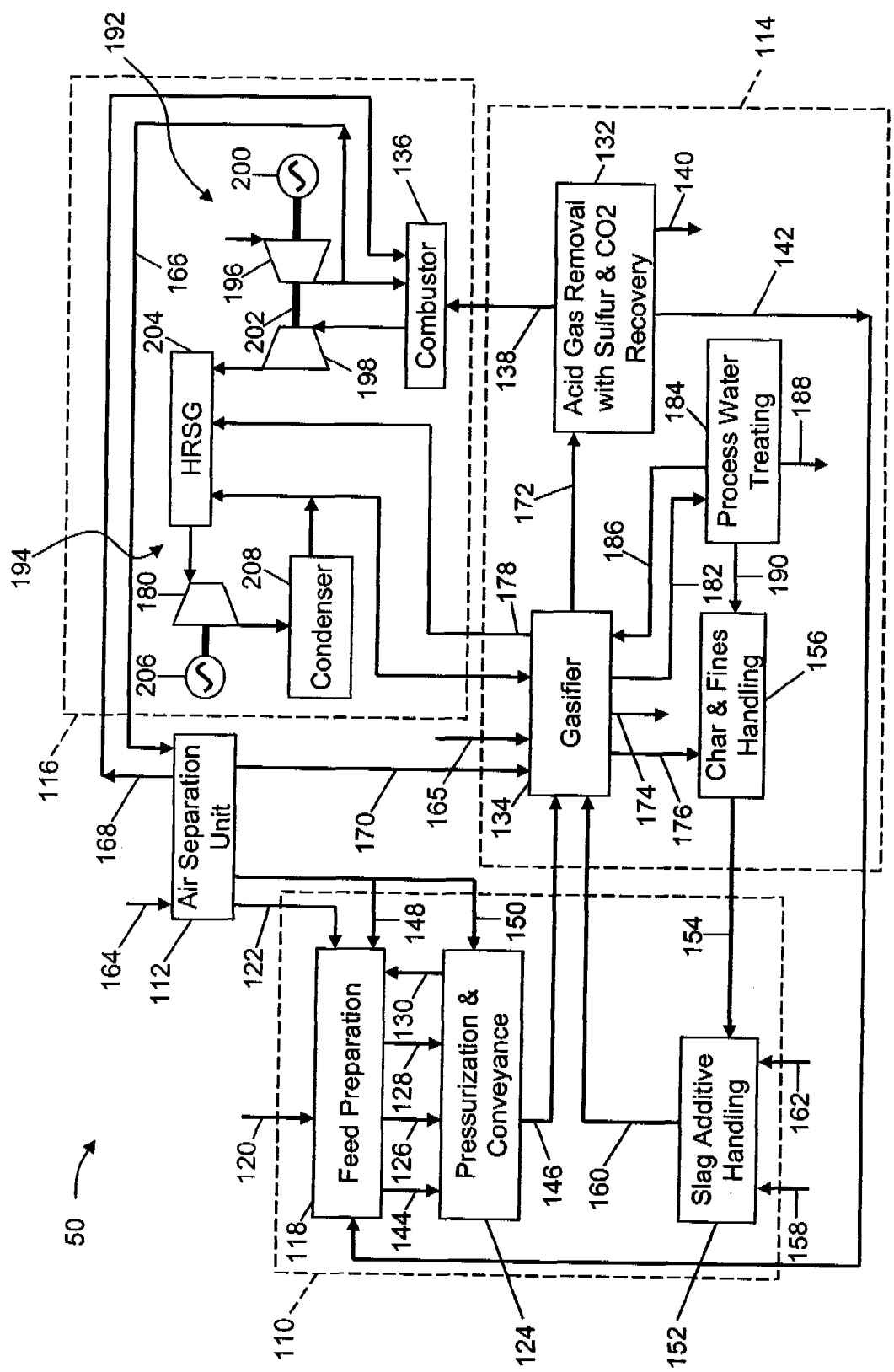
FIG. 1 is a block diagram of a portion of an exemplary IGCC power generation plant that includes an exemplary fuel system.

FIG. 1 is a block diagram of a portion of exemplary IGCC power generation plant 50. In the exemplary embodiment, plant 50 includes a fuel feed system 110, an air separation unit 112 coupled in flow communication with fuel feed system 110, a gasification plant 114 coupled in flow communication with feed system 110, and a power block 116 coupled in flow communication with gasification plant 114 and IGCC power generation plant 50. During operation, air separation unit 112 uses compressed air to generate oxygen for use by gasification plant 114. More specifically, air separation unit 112 separates compressed air received from an external source (not shown) into separate flows of oxygen and a gas by-product, typically nitrogen. In the exemplary embodiment, gasification plant 114 converts solid fuel and oxygen into a clean fuel gas that is burned in power block 116 to produce electrical power, as will be described in more detail herein. It will be clear to those skilled in the art that this diagram is a simplified version of an IGCC power plant block flow diagram and that, for the sake of clarity in explanation, not all of the equipment blocks nor all of the connecting lines found in such a power plant have been shown in the diagram.

A solid carbonaceous fuel (not shown) is channeled into a feed preparation section 118 of feed system 110 via a conduit 120. In the exemplary embodiment, the solid carbonaceous fuel is coal. Alternatively, the fuel may be a petroleum coke, a biomass, or any other solid carbonaceous fuel that will enable IGCC power plant 50 to function as described herein. In another embodiment, a slag additive may be introduced with the solid fuel within conduit 120. Feed preparation section 118 converts the as-received fuel into a solid particulate gasifier feed with a target particle size distribution and internal moisture content suitable for use in IGCC plant 50. Low pressure nitrogen from air separation unit 112 enters feed preparation section 118 via conduit 122, a portion of which is used to convey the solid particulate feed material to a pressurization and conveyance section 124 via conduit 126. The remaining portion of the low pressure nitrogen is heated in feed preparation section 118 and channeled via conduit 128 to pressurization and conveyance section 124 for use in moisture and fines control within section 124. Low pressure nitrogen used in the pressurization and conveyance section 124 is channeled back to feed preparation section 118 via conduit 130 to be filtered, which facilitates removing particulate fines, and is then dried to facilitate removing substantially all water therein, so that the low pressure nitrogen may be reused for various purposes throughout feed system 110. As an alternate to low pressure nitrogen, any gas can be used that allows for the safe and reliable conveyance of the coal in accordance with the feed system described herein.

In the exemplary embodiment, gasification plant 114 includes an acid gas removal section 132 coupled in flow communication with a gasifier 134. Acid gases, such as $H_2S$ COS and $CO_2$, are removed from a quantity of raw syngas to produce a clean fuel gas that is channeled to a combustor 136 located in power block 116 via conduit 138 for producing electrical power, as described in more detail herein. Acid gas removal section 132 produces a byproduct sulfur stream 140 and a sour, $CO_2$-rich gas stream 142 that is compressed and recycled to feed system 110 and that is used as the high pressure conveying gas for transporting the solid particulate fuel into gasifier 134. The $CO_2$ recovered from the syngas within acid gas removal section 132 is compressed and channeled to feed preparation section 118 via conduit 142. This recycled $CO_2$-rich gas stream is heated within feed preparation section 118 and then channeled via conduit 144 to pressurization and conveyance section 124 for use as the high pressure pneumatic conveying gas that transports the particulate solid fuel into gasifier 134 via feed conduit 146. In the exemplary embodiment, high pressure nitrogen from air separation unit 112 is channeled to feed preparation section 118 via conduit 148. In the preferred embodiment, this nitrogen stream, is only used during startup when recycled $CO_2$-rich gas is not yet available (as described in more detail herein), is preheated and then channeled via conduit 144 to pressurization and conveyance section 124 for use as a high pressure pneumatic conveying gas during gasifier startup. Alternatively, any high pressure gas is used during startup that allows for the safe and reliable operation of the gasification system as disclosed herein. Further alternatively, any high pressure gas is used during normal operation that allows for the safe and reliable operation of the gasification system as disclosed herein.

In the exemplary embodiment, feed system 110 includes a slag additive handling section 152 that receives a slurry of char (i.e. unconverted solid particulate fuel) and fine slag via conduit 154 from a char and fines handling section 156. This fine particulate material is recovered as a dilute aqueous slurry from gasification plant 114. The char fraction of this slurry is the unconverted carbon from gasifier 134, and is subsequently recycled via conduit 154. Slag or mineral additive is channeled from an externally located storage section (not shown) to slag additive handling section 152 via conduit 158. The mineral additive is pulverized in a dry rod or ball mill (not shown in FIG. 1) and mixed with the char and fine slag slurry to make a final additive slurry that is channeled by a positive displacement pump (not shown) into gasifier via conduit 160. In an alternative embodiment, a secondary water stream 162 may be used to add water to the final additive slurry fed to gasifier 134 to control temperatures and modify reaction chemistry. In a further alternative embodiment, the mineral additive is fed as dry solids to gasifier 134, in a mixture with the dry particulate fuel or using a separate feed system with a dry solids pump and conveying gas. In a still further alternative embodiment, the mineral matter is fed to gasifier 134 as a separate slurry, separate from the recycle solids slurry. In yet another alternative embodiment, the mineral matter is procured as a preground additive and blended with the recycle solids slurry. In an even further embodiment, the mineral additive is any mineral-containing material that facilitates the operation of the gasification system as described herein. Alternatively, no mineral additive is used and only a quantity of recycled char and fines, or liquid water alone is channeled to gasifier 134 via a separate conduit 165.

During operation, air separation unit 112 separates oxygen from air to produce a relatively high purity (about 95% by volume $O_2$) oxygen feed for use within gasifier 134. A first portion of air enters the air separation unit 112 directly via conduit 164. A remaining portion of air is extracted from the combustion turbine air compressor 196 via conduit 166. In the exemplary embodiment, the first portion of air is about 50% of the total quantity of incoming air. Alternatively, the first portion of air may be any percentage of the total quantity of air that enables fuel feed system 110 to function as described herein. In addition to producing the gasifier oxygen feed, air separation unit 112 also produces nitrogen for use within feed system 110. The remaining nitrogen rich byproduct gas is returned via conduit 168 to the combustion turbine 192 for use as a diluent gas by combustor 136.

In the exemplary embodiment, feeds channeled to gasification plant 114 include pneumatically conveyed particulate solid fuel via conduit 146, slag additive, char and fine slag slurry via conduit 160, and high purity oxygen from air separation unit 112 via conduit 170. During operation, gasifier 134 converts the feeds into raw syngas that is subsequently channeled to acid gas removal section 132 via conduit 172. A coarse slag (not shown) that is separated from the syngas within gasification plant 114 is recovered as a byproduct slag stream 174. Any unconverted carbon is recovered along with fine slag as a dilute slurry and channeled via conduit 176 to handling section 156. High pressure steam generated by the cooling of the hot syngas effluent from gasifier 134 is channeled via conduit 178 to power block 116 wherein the high pressure steam is expanded through a steam turbine 180 to produce electrical power. In the exemplary embodiment, a process water stream (not shown) is channeled as a dilute slurry 182 to a treating section 184 that treats the water to control the concentrations of various contaminants in the circulating process water system, including but not limited to dissolved and suspended solids, and subsequently returns the treated water stream to gasifier 134 for reuse via conduit 186. A clean stream of water (not shown) is channeled from treating section 184 via conduit 188 to disposal or beneficial use beyond the plant boundary. A dilute slurry (not shown) of fine solids removed from the water stream during cleaning is channeled via conduit 190 to handling section 156. In an alternative embodiment, the char and fines are not recycled to the gasifier or are only partially recycled to the gasifier. Instead, the portion of char and fines not recycled to the gasifier is channeled from char & fines handling system 156 via a separate conduit, not shown, to disposal or beneficial use. In a further embodiment, all or a portion of the char and fines are dried before recycle to the gasifier and fed to the gasifier in combination with the coal, in combination with the dry slag additive or as a separate stream. In a still further alternative, the char and fines are recovered from the gasification system using dry scrubbing technology, and all or a portion are recycled to the gasifier in combination with the coal, in combination with the dry slag additive or as a separate stream.

In the exemplary embodiment, power block 116 includes a combustion turbine 192 and a steam system 194. Combustion turbine 192 includes an air compressor 196 operatively coupled to a power expansion turbine 198 and an electrical power generator 200 via a single shaft 202. During operation, the combustion turbine 192 produces power by burning clean fuel gas 138 using, for example, a Brayton Cycle, and steam system 194 produces power by expanding steam through a steam turbine 180 using, for example, a Rankine Cycle. More specifically, clean fuel gas 138 from compressor 196 and diluent nitrogen 168 (used to control $NO_x$ formation) are channeled to combustor 136 and mixed and combusted therein, wherein the exhaust gaseous products of combustion are expanded through expansion turbine 198, thereby turning shaft 202, which in turn operates compressor 196 and generator 200 and electrical power is produced therein. Hot exhaust gas from expansion turbine 198 is channeled through a heat recovery steam generator (HRSG) 204. A high pressure steam generated as the hot exhaust gas cools is combined with high pressure steam 178 generated in syngas cooling section of gasification plant 114 and channeled to steam turbine 180 where it is expanded to make additional electrical power via generator 206. The expanded steam is then condensed within a condenser 208 to produce boiler feed water, which is subsequently channeled to HRSG 204 and the syngas cooler in the gasification plant 114.

Figure 2:
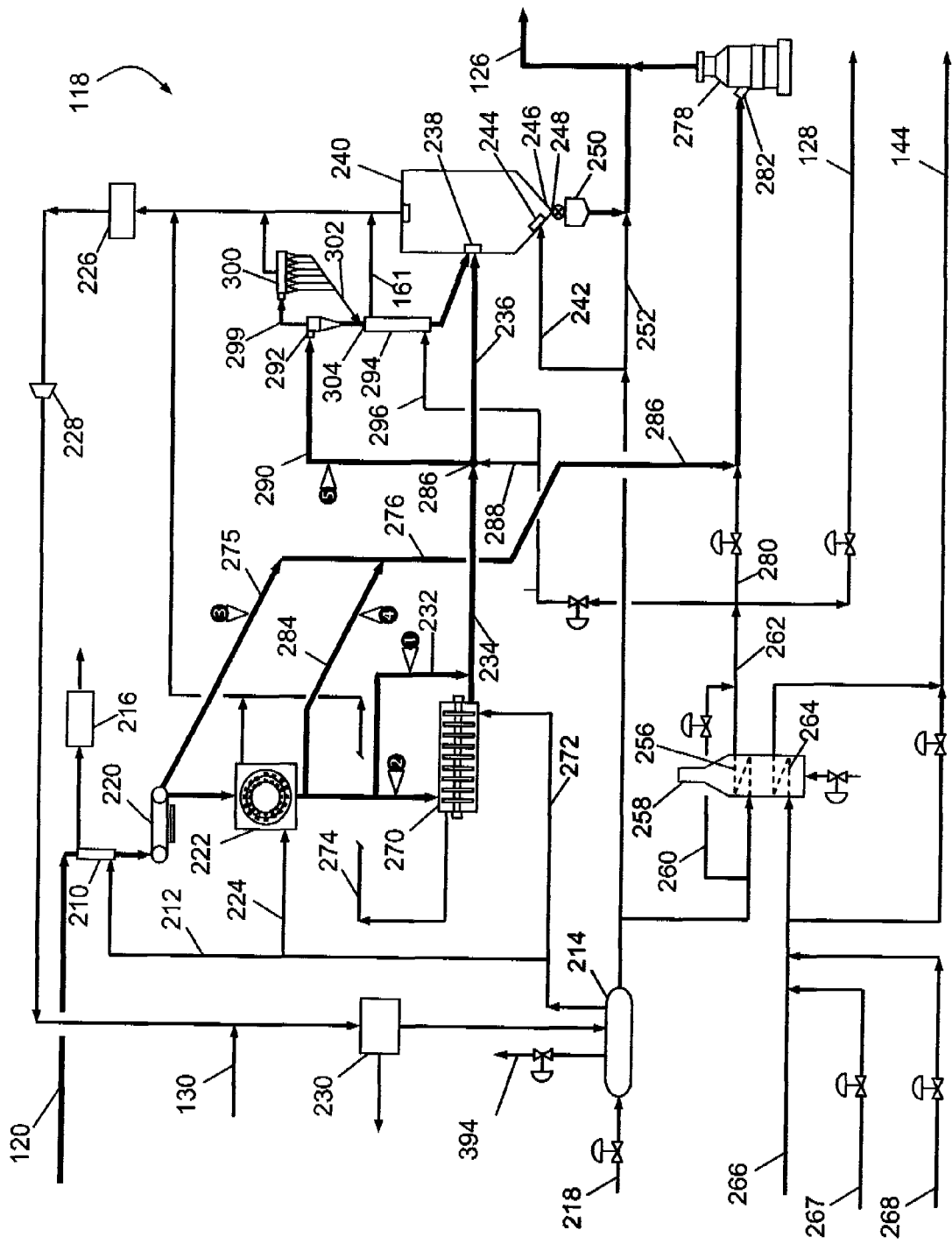
FIG. 2 is a process flow diagram of an exemplary feed preparation system used with fuel system shown in FIG. 1.

FIG. 2 is a process flow diagram of an exemplary feed preparation system 118 used with fuel feed system 110 shown in FIG. 1. More specifically, FIG. 2 illustrates five flow configurations that may be used with fuel feed system 110. In the exemplary embodiment, a volume of sub-bituminous coal, for example Powder River Basin (PRB) coal, not shown, is channeled to feed preparation section 118 via conduit 120 and is conveyed through an air stripping tube 210 wherein the volume of coal is contacted by a counter-current flow of low pressure nitrogen 212 being channeled thereto from a nitrogen storage drum 214. Low pressure nitrogen 212 strips residual air from the interstitial spaces between the incoming pieces of coal. In the exemplary embodiment, the coal is maintained in a nitrogen-rich atmosphere in all equipment operatively coupled downstream from tube 210. Alternatively, any suitable inerting gas, such as $CO_2$ or vitiated air, may be used to maintain coal in a low oxygen-content environment. The nitrogen and associated particulate matter exiting air stripping tube 210 is filtered in a dust control unit 216 prior to being exhausted to the atmosphere. This exhaust valve point is a main loss point for low pressure nitrogen from system 110, and the flow of nitrogen exhausting through dust control unit 216 is the major factor determining the makeup rate 218 from air separation unit 112 (shown in FIG. 1). In the exemplary embodiment, air stripping tube 210 includes a plurality of downwardly sloping baffle plates (not shown) positioned within air stripping tube 210 to facilitate creating a counter-current of nitrogen and particles within tube 210. In an alternate embodiment, air stripping tube 210 may be a featureless column. In another alternate embodiment, air stripping tube 210 may be any configuration that facilitates the stripping of air from the coal in the fuel system disclosed herein, including configurations involving purged air locks and other configurations well known to those skilled in the art.

Coal drops through air stripping tube 210 onto a weigh belt feeder 220 that is operatively coupled downstream from tube 210 and that is used to meter the coal into a cage mill 222. In the exemplary embodiment, cage mill 222 grinds the coal to a desired particle distribution in a single step. Alternatively, a two-step grinding process (not shown) may be used that utilizes a hammer mill followed by a cage mill. In the exemplary embodiment, a target particle size distribution for the coal is about 50% to about 80% filtered through a 100 mesh screen and about 100% filtered through a 10 mesh screen. Alternatively, any appropriate grinding equipment may be used in light of the type of coal feed within fuel feed system 110, and that enables fuel feed system 110 to function as described herein.

In the exemplary embodiment, a low pressure nitrogen gas or other suitably inert gas purge stream 224 maintains a supply of gas purge on the grinding equipment to prevent buildup of coal fines and to remove moisture liberated from the coal by the cleaving of coal particles and evaporated from the coal by the heat of grinding. Purge stream 224 is combined with spent purges from other parts of the system, and the combined stream is channeled through dust filter 226, compressed in blower 228 and channeled to inert gas drying package 230. Filter 226 facilitates substantially removing fine coal dust from the purge stream 224, and drying package 230 substantially removes all moisture from the purge stream 224. Inert gas is then recycled to storage drum 214 for reuse within system 110, and condensed water from the inert gas drying package 230 is recycled for use elsewhere in the plant or routed to an externally located wastewater treatment unit (not shown). In an alternative embodiment, condensed water from inert gas drying package 230 may be recycled (not shown) for use elsewhere in gasification system 50, such as but not limited to the additive slurry tank 406, described later. In another alternative embodiment, inert gas drying package 230 is not used to substantially dry the inert gas, but is an inert gas humidity and temperature control unit that adjusts the humidity and temperature of the inert gas as needed to help maintain the coal within fuel feed system 110 at a desired moisture level content.

In the exemplary embodiment and in one exemplary flow configuration (1), ground coal particles are channeled via conduits 232, 234 and 236 into an inlet 238 of a main coal storage silo 240. In the exemplary embodiment, silo 240, and conduits 232, 234 and 236 are insulated to substantially prevent cooling of the coal and condensing of any moisture liberated by the grinding process. A stream of low pressure nitrogen or other inert gas 242 is channeled from drum 214 and enters a purge gas inlet 244 in storage silo 240. During operation, the nitrogen or inert gas flow 242 may be used to fluidize a lower portion 246 of storage silo 240 to enable the solids to flow of out of silo 240. It also maintains a sufficiently inert environment throughout silo 240 to substantially prevent spontaneous combustion therein. And as it rises upwards through silo 240, the nitrogen or inert gas flow 242 strips away any excess, residual moisture from the coal solids that may have been liberated during the grinding process and thus substantially prevents moisture from re-condensing as the coal particles cool.

In the exemplary embodiment, coal is channeled from an outlet 248 positioned on the bottom 246 of storage silo 240 and is metered into a pneumatic pick-up station 250 where the coal is entrained in a flow of low pressure nitrogen gas 252 channeled from the drum 214. The nitrogen or other inert gas 252 transports the coal particles via dense phase pneumatic transport in conduit 126 to feed pressurization and conveyance system 124 (shown in FIG. 1). In an alternative embodiment, the coal particles may be transported by any means that facilitates the operation of the fuel feed system 110 as described herein.

In the exemplary embodiment, feed preparation section 118 includes equipment for heating gas used in conveying coal and for reducing moisture therein. More specifically, low pressure nitrogen or other inert gas from drum 214 is heated in a low pressure coil 256 of a natural gas-fired heater 258. Alternatively, a conduit 260 is configured to bypass coil 256 and is used to adjust the final temperature of the heated nitrogen 262. This heated low pressure nitrogen or other inert gas stream 262 is used for conveying and moisture removal in some of the other flow configurations shown on FIG. 2 as well as in downstream equipment, as described in more detail herein. Heater 256 includes a high pressure gas heating coil 264 that increases a temperature of a high pressure conveying gas (not shown) for use in the feed pressurization and conveying section 124 (shown in FIG. 1). In the exemplary embodiment, the high pressure conveying gas is recycled sour $CO_2$ 266. Alternatively, the high pressure conveying gas may be high pressure nitrogen 268 channeled thereto from air separation unit 112, or the high pressure conveying gas may be natural gas channeled thereto from an external source (not shown). As another alternative, the high pressure conveying gas may be any gas suitable for conveying the coal within fuel feed system 110 and into the gasifier 134. In a further alternative, fired heater 256 is replaced by other heating means, including, but not limited to, direct heating by the combustion of air and natural gas or indirect heating by heat exchange with steam or other hot process gases available from elsewhere in IGCC plant 50.

In an alternative embodiment and in the second exemplary flow configuration (2), a steam-jacketed paddle dryer 270 is coupled in flow communication between the cage mill 222 and main storage silo 240. Paddle dryer 270 is purged with low pressure nitrogen or inert gas stream 272 to remove moisture liberated during the coal drying process. Moisture-laden nitrogen or inert gas 274 then combines with nitrogen or inert gas from cage mill 222 and is processed to remove coal dust and water vapor, as described in more detail herein. Paddle dryer 270 may be incorporated into feed preparation system 118 when a higher degree of moisture removal from the coal particles is desired, or when the feed coal requires additional drying to remove surface moisture. Alternatively, the coal may be dried using other drying methods that facilitate operation of the fuel feed system as described herein.

In another alternative embodiment and in the third exemplary flow configuration (3), coal is channeled through air stripping tube 210 onto a weigh belt feeder 220 and is channeled via conduit 275 through a chute 276 into a pulverizer 278, e.g. a bowl mill. In the exemplary embodiment, pulverizer 278 is a roller mill. Alternatively, pulverizer 278 may be a bowl mill or an impact mill or any such device used to grind coal to a target particle size, and that enables fuel feed system 110 to function as described herein. Low pressure nitrogen or other inert gas, heated within heater 258 or other heating means not shown, is channeled via conduit 280 to a pulverizer inlet 282 along with coal, where it substantially dries the coal particles to the target moisture level as the coal is being pulverized. For example, the final coal moisture level can be controlled by adjusting the temperature of stream 282. Other control methods include controlling the humidity and flow rate of the warm nitrogen or other inert gas. The warm nitrogen or other inert gas carries the dried coal particles out of the pulverizer 278 and transports them via conduit 126 to feed pressurization and conveyance section 124 (shown in FIG. 1).

In another alternative embodiment and in the fourth exemplary flow configuration (4), an additional grinding mill 222 is coupled in flow communication between weigh belt feeder 220 and pulverizer 278. In this embodiment, grinding mill 222 may be a hammer mill or other suitable mill when coupled in conjunction with pulverizer 278 that produces the desired particle size distribution. Coal from the weigh belt feeder 220 is crushed or pre-ground in a first step in mill 222 and then is channeled via conduits 284 and 286 to pulverizer 278.

In another alternative embodiment and in the fifth exemplary flow configuration (5), coal is channeled from air purge tube 210 onto weigh belt feeder 220 and is directed into cage mill 222 for grinding. The ground coal is then channeled past paddle dryer via conduit 232 and is channeled via insulated conduit 234 to pneumatic transport pickup point 286. At this point, hot, dry, low pressure nitrogen or other inert conveying gas 288 from heater 258 entrains the ground coal particles and channels the ground coal in dense phase transport via insulated conduit 290 into a cyclone 292. Alternatively, the coal particles may be transported by any means that facilitates the operation of the fuel feed system as described herein. The temperature of the hot conveying gas and the length of the insulated transport conduit 290 is such that, when combined with the heat of grinding from cage mill 222, both surface moisture and a portion of the moisture internal to the pores of the coal particles is vaporized and driven into the bulk gas phase. The amount of vaporization is controlled by adjusting the temperature, flow rate and humidity of stream 288.

In the fifth flow configuration, the particulate solids are separated from the conveying gas in cyclone 292 and drop into a moisture stripping column 294. In this embodiment, moisture stripping column 294 includes a plurality of downwardly sloping baffle plates (not shown) positioned within moisture stripping column 294 to facilitate creating a counter-current of nitrogen or other inert gas and particles therein. Alternatively, moisture stripping column 294 may be a featureless column. The particles then encounter a second, upwardly flowing stream 296 of hot, dry nitrogen or other inert gas from heater 258 therein. This stripping gas stream 296, which flows counter-current to the downwardly flowing coal particles, strips away residual moisture from the interstitial spaces between coal particles that was liberated during the grinding but that was not removed within the cyclone 292. Hot, dry coal particles exit stripping column 294 and enter silo 240 at inlet 238. The coal is channeled via dense phase pneumatic transport within conduit 126 to the feed pressurization and conveyance section 124 (shown in FIG. 1) as described in more detail herein. Moreover, finely ground coal within an overhead flow 299 from cyclone 292 is channeled through a secondary cyclone 300 that returns the coal fines back to stripping column 294 via a conduit 302 to an inlet 304. Excess gas from secondary cyclone 300 is channeled to dust collection system 226 where, along with the other purges from the system, the combined gas is filtered to remove substantially all remaining coal dust. After compression by blower 228, the gas is channeled to gas dryer 230 for removal of substantially all of the residual moisture that was present as a result of grinding and drying the coal. The dry, particle free nitrogen or other inert gas exits dryer 230 and may then be recycled to drum 214 for reuse throughout the fuel feed system 110.

Figure 3:
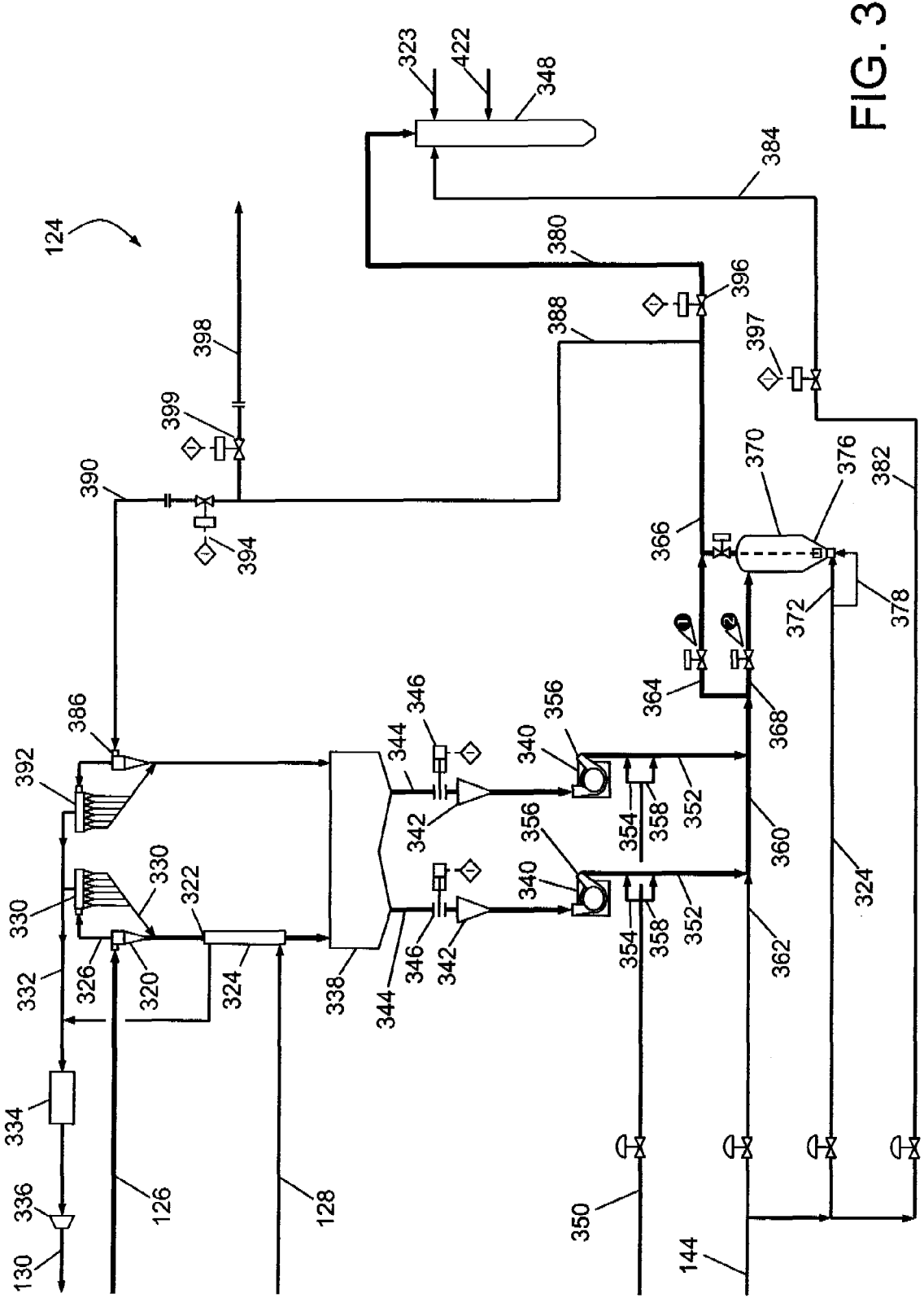
FIG. 3 is a process flow diagram of an exemplary feed pressurization and conveyance system used with the fuel system shown in FIG. 1.

FIG. 3 is a process flow diagram of an exemplary feed pressurization and conveyance system 124 used with the fuel feed system 110 shown in FIG. 1. Particulate solids with the desired size distribution and moisture content are conveyed from feed preparation section 122 (shown in FIG. 1) via dense phase pneumatic transport in conduit 126, as described in more detail herein. A storage bin primary inlet cyclone 320 separates solids from the low pressure nitrogen or other inert transport gas and discharges the solids to an inlet 322 of a storage bin inlet stripping tube 324 for further processing. Overhead gas from cyclone 320 is then channeled via conduit 326 through a storage bin secondary inlet cyclone 328 that removes a substantial portion of entrained coal fines from the transport gas and channels the coal fines via conduit 330 to the inlet 322 of stripping tube 324. Secondary cyclone 330 overhead gas is channeled via conduit 332 to a dust control system 334. The substantially dust-free gas is then compressed by a blower 336 and channeled to a nitrogen drying package 230 (shown in FIG. 2) for reuse throughout fuel feed system 110. Alternatively, drying package may be a temperature and humidity control package.

The coal particles removed by cyclones 320 and 330 enter inlet 322 and are channeled downwards against a countercurrent flow of heated nitrogen or other inert stripping gas 128. In this embodiment, stripping tube 324 includes a plurality of downwardly sloping baffle plates (not shown) positioned within stripping tube 324 to facilitate creating a counter-current of nitrogen and particles therein. Alternatively, stripping tube 324 may be a featureless column. The stripping gas removes residual moisture that may remain following grinding and drying, as is described in more detail herein. After passing through stripping tube 324, the coal particles enter a solids pump storage bin 338.

In the exemplary embodiment, storage bin 338 is configured to provide coal feed to two solids pumps 340 that operate in parallel. Alternatively, storage bin 338 may be configured to feed any number of solids pumps 340. As a further alternative, fuel feed system 110 can be configured to have any number of storage bins 338 and solids pumps 340 that facilitate the operation of the fuel feed system as described herein. In the exemplary embodiment, solids pump 340 is a rotary, converging space Solids Transport and Metering pump utilizing Stamet™ Posimetric® feed technology, otherwise known as a Stamet™ solids pump commercially available from GE Energy, Atlanta, Ga. This pump is capable of transporting solids from atmospheric pressure to pressures well over 1000 psig with a strongly linear relationship between pump rotational speed and solids mass flow. Alternatively, any type of pump or pressurizing conveyance device may be used that handles and pressurizes solids as described herein.

In the exemplary embodiment, a suction feed vessel 342 is coupled in flow communication between each outlet conduit 344 from storage bin 338 and each solids pump 340, wherein each suction feed vessel 342 controls the flow of coal to each solids pump 340. More specifically, each feed vessel 342, which is designed to withstand full gasifier system pressure, includes an inlet safety valve 346 that is closed in the event of a pump failure. Alternatively, or in cooperation with inlet safety valve 346, additional outlet safety valves, not shown, may be located in the discharge line 352 of each solids pump. In the exemplary embodiment, feed vessels 342 are live-bottom vessels configured to ensure that the suction inlet of each respective solids pump 340 is filled with coal, thereby ensuring a continuous a flow of particulate solids through each pump. Alternatively, lines 344 are designed to provide a buffer volume, and may incorporate inlet safety valves 346 and other features, such as but not limited to contoured and vibratory surfaces to assist with the flow of solids into the inlet of pumps 340.

In the exemplary embodiment, particulate solid fuel from suction feed vessels 342 is pressurized by solids pumps 340 to a pressure level sufficient to enable the solids to flow through feed injector 348 and into the gasifier 134 (not shown in FIG. 1). A high pressure stream of nitrogen 350 from the air separation unit 112 (shown in FIG. 1), which may or may not be preheated, is coupled to a discharge conduit 352 of each solids pump 340 at two locations, a first connection 354 located adjacent the discharge 356 of solids pump 340, and a second connection 358 positioned downstream from first connection 354. First connection 354 provides a flow of seal nitrogen that traverses backwards through the compacted solid particles moving through solids pump 340. Although gas leakage backwards through solids pump 340 is minimal, the seal nitrogen prevents leakage of conveying gas, oxygen or syngas backwards through the pump. Second connection 358 provides a relatively higher velocity jet of nitrogen directed at the particulate solids emerging from the solids pump discharge 356. The high speed jet breaks up occasional agglomerations of particles and provides a substantially even distribution of the particulate fuel that exits the solids pump 340 and further enables the solids to transition from the highly compacted condition inside the pump to the free flowing fluidized condition required for high pressure pneumatic transport downstream of solids pumps 340. In the preferred embodiment, the high pressure pneumatic transport of coal downstream of the solids pump 340 is dilute phase transport. Alternatively, the high pressure pneumatic transport of coal downstream of solids pump 340 is of any type that facilitates operation of the fuel and gasification systems. As an alternative to the high speed jet, any mechanical delumping device may be used at any point on conduit 352 that will enable fuel feed system 110 to function as described herein.

In the exemplary embodiment, following the delumping operation, the coal particles are channeled via discharge conduit 352 into a pneumatic transport conduit 360. Therein, a high pressure conveying gas 362 from heater 258 (shown in FIG. 2) entrains the coal solids via dilute phase pneumatic conveyance directly to the gasifier feed injector 348 via conduits 364, 366 and 380. Solids flow control herein is achieved by varying the speed of operation of solid pumps 340 and/or the flow, pressure and temperature of the high pressure conveyance gas. In an alternate embodiment, the high pressure carrier gas is not heated. In a further alternate embodiment, the high pressure carrier gas is processed any way that facilitates operation of the fuel and gasification systems as described herein.

In an alternative embodiment, the solids are channeled via conduit 368 into a high pressure feed vessel 370 that serves as a buffer in the conduit between solids pumps 340 and gasifier feed injector 348. During operation, feed vessel 370 is an alternative flow path that may be used to improve solids flow to gasifier 134 (not shown in FIG. 1). Feed vessel 370 may help minimize the effects of temporary flow variations or interruptions at the solids pumps 340, or in the alternative embodiment where solids pumps 340 are not Posimetric pumps that may not have the same or substantially the same continuous flow characteristics as the Posimetric technology described herein.

During operation of feed vessel 370, and in one embodiment, a portion of a high pressure conveying gas is diverted via conduit 324 from the solids transports conduit 360 and channeled via conduit 372 to a bottom portion 376 of the feed vessel 370 to fluidize the solids and enhance flow characteristics thereof. A remainder 378 of the high pressure conveying gas is used to channel the solids out of feed vessel 370 and into conduits 366 and 380 towards feed injector 348. In this embodiment, flow control is achieved by adjusting the operational speed of solids pumps 340 and by adjusting the flow rates of the high pressure conveying gas streams 372 and 378 that are channeled to the bottom 376 of feed vessel 370.

In another alternative embodiment, it may be necessary to recycle more sour $CO_2$ gas to the gasifier 134 (shown in FIG. 1) than is needed to convey the solids or that can be handled by the solids conveyance conduits. In this embodiment, an additional conduit 382 and 384 is available for feeding gas directly to the feed injector 348. This additional volume of gas may be used to moderate the temperature within gasifier 134 (not shown in FIG. 3), to modify the spray characteristics of the feed injector 348, or to modify the chemistry of the gasification reactions.

Figure 4:
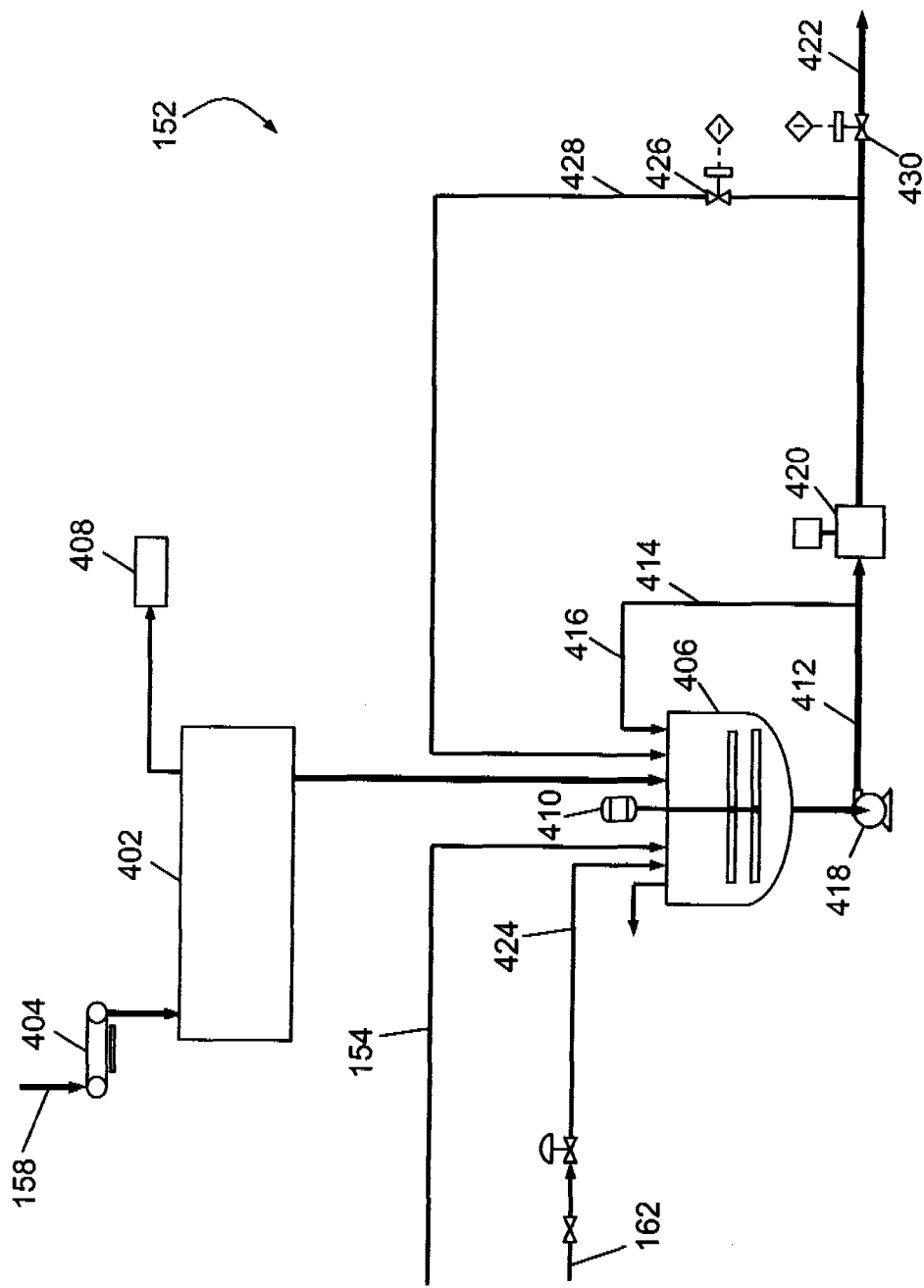
FIG. 4 is a process flow diagram of an exemplary slag additive system used with the fuel system shown in FIG. 1.

FIG. 4 is a process flow diagram of an exemplary slag additive handling section 152 used with the fuel feed system 110 shown in FIG. 1. In the exemplary embodiment, slag additive handling section 152 includes a slag additive mill 402, such as a rod mill or ball mill, that receives a quantity of slag additive (not shown) from an externally located source (not shown) via a slag additive weight belt feeder 404. A slag additive/recycle fines mix tank 406 is coupled downstream and in flow communication from mill 402. More specifically, slag additive is ground to the target particle size distribution within mill 402, which, in the exemplary embodiment, operates in a dry mode. Alternatively, any type of mill that facilitates operation of the fuel system described herein may be used. Fugitive emissions from mill 402 are captured in a dust collection system 408.

In the exemplary embodiment, char and fines slurry is channeled via conduit 154 from handling section 156 (shown in FIG. 1) into the mix tank. Dry particulate additive from the mill 402 is mixed with the char and fines slurry within mix tank 406 by an agitator 410. A plurality of conduits 412 and 414 form a continuous loop 416 through which a mix tank pump 418 circulates slag additive/recycle fines slurry past the suction of charge pump 420 to ensure that the charge pump always has an adequate supply of slurry and to provide additional mixing in tank 406. Slurry is withdrawn from the suction recirculation loop 416 into charge pump 420 positioned downstream from mix tank pump 406. In the exemplary embodiment, charge pump 420 is a high pressure positive displacement pump that feeds the slurry via conduit 422 to gasifier feed injector 348 (shown in FIG. 3). Once the moisture level of the solid fuel being channeled to gasifier 134 (shown in FIG. 1) has been set by the operation of the feed preparation section 118, the final, total amount of water fed to gasifier 134 can be controlled by adjusting the slurry concentration of the char and fines slurry and/or the amount of fresh water makeup 424 added to mix tank 406. Alternatively, the slag additive may be ground together with the recycle solids in a wet rod or ball mill rather than grinding the slag additive separately and then blending it with the recycle solids. The product from such a co-grinding operation is screened and then sent to mix tank 406.

Referring now to FIG. 1, and in the exemplary embodiment, prior to ignition of combustion turbine 192 and start up of gasifier 134, another carrier gas source must be provided until sufficient levels of $CO_2$ are produced by gasifier 134 and can be recovered to maintain a running fuel feed system 110. This secondary carrier gas may by necessary because typically $CO_2$ cannot be recovered from the syngas until the gasifier starts, or, in the case of a multi-train gasification operation, there may not be sufficient CO2 available to provide the required amount of CO2 to the operating trains as well as the train undergoing startup. In the exemplary IGCC plant 50, high pressure nitrogen obtained from the air separation unit 112 is not needed as a clean fuel gas diluent for clean fuel gas 138 until after gasifier 134 has been started and syngas is produced therein. In an alternative embodiment where the gasifier is integrated into an ammonia production plant rather than an IGCC plant, the nitrogen from the air separation unit may not be needed for ammonia synthesis until after the gasifier is started and syngas is produced.

Drum 214 is filled with low pressure nitrogen from the air separation unit 112 or from on-site storage, not shown. Coal is introduced into inlet air purge tube 210 (shown in FIG. 2) and is subsequently ground in cage mill 222, as described herein, and loaded into main coal silo 240 wherein moisture by grinding is purged out by nitrogen 242. Low pressure conveying gas 252 from drum 314 entrains the coal from silo 240 to storage bin 338, as shown in FIGS. 2 and 3. Once bin 338 is loaded, high pressure nitrogen from the air separation unit 112 is heated in heater 258 and a continuous flow thereof is channeled to cyclone 386 (shown in FIG. 3) via successive conduits 144, 362, 360, 364, 366, 388 and 390. Nitrogen is channeled from cyclone 386 through the high efficiency cyclone package 392, the dust collection system 334, blower 336, the $N_2$ dryer 230 and exhausted through a vent 394 in drum 214. Once the $N_2$ conveying gas flow has been established at the correct rate, solids pumps 340 are started and pressurized solids are channeled to the conveying gas transport conduit 360. The dilute phase flow of solids is direct through conduits 364, 366, 386, 388 and 390 to cyclone 386. The cyclone 386 sends the solids back into the solids pump storage bin 338, and the nitrogen passes through nitrogen return system to drum 214. This off-line operation allows the gas and solids flows to be adjusted to their correct flow rates before introduction to the gasifier.

In the exemplary embodiment, a flow rate for the slag additive/char & fines slurry is also established. Referring again to FIG. 4, and in the exemplary embodiment, initially there is no recycle char and fines slurry available into which the particulate slag additive may be mixed. Rather, a start-up mixture of slag additive is produced with fresh water in mix tank 406. Slurry circulation pump 418 continuously circulates the startup slurry past the suction of the charge pump 420, and charge pump 420 circulates pressurized slurry through conduit 428 back to the mix tank 406. This circulation allows the correct flow rate for the additive slurry to be established off-line prior to startup of gasifier 134.

Following the establishment and stabilization of flow rates for additive slurry, pneumatically-conveyed coal solids and oxygen, a block valve 426 on conduit 428 closes substantially concurrently with the opening of a block valve 430 on conduit 422, and thus slurry is transferred to gasifier feed injector 348 instead of being recirculated back into mix tank 406. In the exemplary embodiment, substantially concurrently therewith, block valve 394 on conduit 390 closes and a block valve 396 on conduit 380 substantially concurrently opens. $N_2$-conveyed solids therein are transferred to the gasifier feed injector 348. When oxygen is subsequently introduced to gasifier 134, the thermal energy stored in the gasifier 134 initiates the reactions, and syngas generation begins. As syngas is channeled downstream from gasifier 134, $CO_2$ recovery begins, and the $CO_2$ stream is compressed and recycled to the front end of the fuel feed system 110 via conduit 142 (as shown in FIG. 1). As more $CO_2$ becomes available from gasifier 134 within conduit 142, high pressure nitrogen is progressively replaced with recycled sour $CO_2$ as the high pressure conveying gas. The high pressure nitrogen then becomes available for use as a clean fuel gas diluent in the combustion turbine combustor 136. However, until such a time as the full amount of high pressure nitrogen diluent becomes available at combustor 136, water or steam may be used as a temporary, substitute diluent in the combustor.

Following start-up, and in the exemplary embodiment, unconverted carbon, i.e. char, along with fine slag begins to accumulate in the gasification plant 114 char & fines handling section 156. The char and fines are recovered in handling section 156 as a dilute slurry. The slurry is then channeled to the slag additive handling system 152. As this slurry of char and fines becomes available for recycle to the feed system 110, the fresh water makeup 424 to mix tank 406 is progressively replaced by this char and fines slurry until all of the char is being recycled to gasifier 134. The final, total amount of water fed to gasifier 134 is controlled by adjusting the slurry concentration of the char and fines slurry and/or the amount of fresh water makeup added to mix tank 406. If it is desired to add additional sour $CO_2$ gas to the gasifier following start-up, this may be accomplished by opening block valve 397 on conduit 384.

In an alternative embodiment, high pressure nitrogen from the air separation unit 112 may not be available for use as conveying gas during gasifier startup. In this embodiment, compressed natural gas 267 may be used instead of the high pressure nitrogen. Natural gas may be used as a backup fuel for combustion turbine 192 and sufficient quantities may be available for use as a high pressure conveying gas in place of the high pressure nitrogen. In this embodiment, coal is ground, dried and loaded into the main coal silo 240 and solids pump storage bin 338. High pressure natural gas is then heated in heater 258 and channeled via conduits 144, 360, 362, 364, 366, 388, and 398 to a plant flare (not shown). During startup, this allows the natural gas flow rate to be stabilized at the desired value. Gasifier 134 may then be started using natural gas without the use of any coal solids, since natural gas is a suitable fuel for the gasifier all by itself. Since natural gas has no ash for which a slag modifier is required, the gasifier can be started up on natural gas without having to start the slag additive system 152.

In this embodiment, gasifier 134 is started on natural gas by substantially simultaneously closing block valve 399 in conduit 398 and opening block valve 396 in conduit 380. Oxygen is then channeled into gasifier 134 through conduit 323. Thermal energy stored in the gasifier refractory initiates the reactions, and syngas generation begins, as described in more detail herein. In this embodiment, gasifier 134 may operate with natural gas as the sole feed for any practical duration of time.

In this alternative embodiment, the introduction of solid particulate fuel begins by activating the solids pumps 340. Coal particles from the discharge of pumps 340 drop into the solids pickup conduit 360 wherein the coal is entrained by the flow of natural gas to gasifier feed injector 348 via conduit 380, as described in more detail herein. The addition of coal to the natural gas substantially increases the flow of fuel to gasifier 134, and a flow rate of oxygen to the gasifier must be increased in order to provide an adequate amount of oxygen to gasify all of the carbon in the feed. The slag additive slurry must also be started up so that slag additive slurry can be fed to the gasifier by closing block valve 426 on conduit 428 and opening block valve 430 on conduit 422. Gasifier 134 may run on this mixture of natural gas and coal for any practical duration of time. During operation, the natural gas and coal flow rates may not exceed the downstream demand for syngas. More specifically, gasifier 134 may be started up with a low flow rate of natural gas so that, when the coal particles are added, an amount of syngas is produced that satisfies the downstream process demand. Alternatively, if the gasifier operations have already been established at a higher than desirable rate for the transition to coal feed, the natural gas flow may be reduced, together with an appropriate modification of the oxygen flow rate, to allow the introduction of coal particles into the natural gas. As syngas production continues in the gasifier, $CO_2$ may be recovered from the syngas, compressed and routed to conveying gas heater 258 to progressively replace the natural gas. As the composition of the conveying gas transitions from 100% natural gas to 100% recycled sour $CO_2$, the flow rate of solids into the solids pickup conduit 360 is increased to maintain substantially the same level of fuel energy flow into gasifier 134. The flow rate of slag additive/recycle char and fines slurry is also increased to match the increasing flow rate of coal. Using natural gas during start-up operations allows gasifier 134 to be started up using a clean, sulfur-free fuel, which is therefore advantageous for IGCC plants located in regions with process gas flaring restrictions.

Described herein is a fuel feed system that may be utilized in IGCC plants that provides a cost-effective, highly efficient and reliable system for supplying coal to an IGCC plant by integrating coal grinding, moisture control and a solids pump upstream of a gasifier. In each embodiment, the fuel preparation system controls the moisture being channeled to the gasifier to a desired level that is between the moisture content in a dry feed system and the moisture content in a slurry feed system. More specifically, a pulverized PRB coal feed having a well-controlled internal moisture content may be tailored to optimize not only the gasifier performance, but also the performance of the overall system in which the gasifier plays a central role. Further, in each embodiment, the addition of the solids pump upstream of the gasifier facilitates pressurizing the coal from atmospheric pressure at the pump inlet to a pressure above the gasifier operating pressure in order to facilitate pneumatic conveyance of the coal into the gasifier. As a result, a continuous flow of pressurized coal is channeled to the gasifier. Moreover, an improved feed system is disclosed that provides an alternative to conventional dry feed systems for feeding low rank coals, such as sub bituminous coals and lignites, to a refractory-lined, entrained-flow gasifier for the production of syngas for power generation in an IGCC plant. As such, a simpler, more robust method of providing a feed system that is similar to slurry feed systems is disclosed that replaces the expensive lock hoppers, valves and compressors with an alternative method of pressurizing the solids used therein. Accordingly, the costs associated with maintaining a dry feed system and the inefficiencies associated with a slurry feed system are both avoided.

Exemplary embodiments of fuel feed systems are described above in detail. The fuel feed system components illustrated are not limited to the specific embodiments described herein, but rather, components of each system may be utilized independently and separately from other components described herein. For example, the fuel system components described above may also be used in combination with different fuel system components.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gasification system comprising:
    a gasifier; and
    a fuel feed system comprising:
        a feed preparation section comprising:
            a grinding device for grinding a particulate fuel to a predetermined size; and
            a humidity control unit configured to adjust a humidity of an inert gas to control a moisture content associated with the particulate fuel;
        a pressurization and conveyance section coupled in flow communication with said feed preparation section, said pressurization and conveyance section comprising at least one solids pump configured to receive a flow of the particulate fuel at a first pressure and discharge the particulate fuel at a second pressure;
        a first conduit coupled in flow communication with said at least one solids pump, said first conduit configured to channel the pressurized particulate fuel to a feed injector of the gasifier; and
        a slag additive handling section comprising a pump to feed a slurry into the feed injector of the gasifier and substantially control a total water content of a quantity of feeds into the gasifier by adjusting a concentration of the slurry fed into the gasifier, and further control melting and flow characteristics of a quantity of particulate fuel ash within the gasification system.

2. A gasification system in accordance with claim 1, further comprising:
    a separation device configured to separate at least one of moisture and air from the particulate fuel, said separation device comprising at least one of:
    one or more moisture stripping tubes positioned upstream of said solids pump, said one or more moisture stripping tubes configured to remove at least a portion of the moisture associated with the particulate fuel; and
    one or more air stripping tubes positioned upstream of said one or more moisture stripping tubes, said one or more air stripping tubes configured to remove at least a portion of the air associated with the particulate fuel.

3. A gasification system in accordance with claim 2, wherein said feed preparation section further comprises a moisture stripping assembly comprising a low pressure conveying line and a cyclone coupled in flow communication with the at least one moisture stripping tube, said moisture stripping assembly configured to channel a counter-flow of a drying gas against an incoming flow of particulate fuel to facilitate further drying of the particulate fuel, wherein at least one of the drying gas, the low pressure conveying line and the cyclone are heated.

4. A gasification system in accordance with claim 1, wherein said grinding device further comprises at least one mill configured to grind the particulate fuel to a predetermined particle size distribution.

5. A gasification system in accordance with claim 4, wherein said feed preparation section further comprises at least one dryer assembly coupled in flow communication with said at least one mill, said at least one dryer assembly configured to remove moisture from the particulate fuel.

6. A gasification system in accordance with claim 1, wherein said grinding device comprises a pulverizer configured to reduce a particle size distribution of the particulate fuel; and said feed preparation section further comprises a belt feeder configured to receive a flow of fuel particulate and channel the particulate fuel to said pulverizer.

7. A gasification system in accordance with claim 6, wherein said grinding device of said feed preparation section further comprises a mill coupled in flow communication upstream of said pulverizer and configured to grind the particulate fuel to the predetermined particle size distribution.

8. A gasification system in accordance with claim 1, wherein said pressurization and conveyance section further comprises:
an outlet conduit; and
a feed vessel coupled between said outlet conduit and at least one solids pump, said feed vessel configured to smooth a flow of the particulate fuel.

9. A gasification system in accordance with claim 8, wherein said outlet conduit comprises a flow of a gas configured to facilitate providing a substantially even distribution of the particulate fuel exiting said at least one solids pump.

10. A gasification system comprising:
a gasification plant comprising:
a gasifier; and
a char and fines handling device for recovering char and fine slag accumulated in the gasification plant as a dilute slurry; and
a fuel feed system coupled in flow communication upstream of said gasifier, said fuel feed system comprising:
a feed preparation section comprising:
a grinding device for grinding a particulate fuel to a predetermined size; and
a humidity control unit configured to adjust a humidity of an inert gas to control a moisture content associated with the particulate fuel;
a pressurization and conveyance section coupled in flow communication with said feed preparation section, said pressurization and conveyance section comprising at least one solids pump configured to receive a flow of the particulate fuel at a first pressure and discharge the particulate fuel at a second pressure;
a first conduit coupled in flow communication with said at least one solids pump, said first conduit configured to channel the pressurized particulate fuel to a feed injector of said gasifier; and
a slag additive handling section comprising a pulverizer for pulverizing a mineral additive that is mixed with the dilute slurry received from the char and fines handling device to produce an additive slurry, the slag additive handling section further comprising a pump to feed the additive slurry into the feed injector of the gasifier and substantially control a total water content of a quantity of feeds into the gasifier by adjusting a concentration of the additive slurry fed into the gasifier, and further control melting and flow characteristics of a quantity of particulate fuel ash within the gasification system.

11. A gasification system in accordance with claim 10, further comprising:
a separation device configured to separate at least one of moisture and air from the particulate fuel, said separation device comprising at least one of:
one or more moisture stripping tubes positioned upstream of said solids pump, said one or more moisture stripping tubes configured to remove at least a portion of the moisture associated with the particulate fuel; and
one or more air stripping tubes positioned upstream of said one or more moisture stripping tubes, said one or more air stripping tubes configured to remove at least a portion of the air associated with the particulate fuel.

12. A gasification system in accordance with claim 11, wherein said feed preparation section further comprises a moisture stripping assembly comprising a low pressure conveying line and a cyclone coupled in flow communication with the at least one moisture stripping tube, said moisture stripping assembly configured to channel a counter-flow of a drying gas against an incoming flow of particulate fuel to facilitate further drying of the particulate fuel, wherein at least one of the drying gas, the low pressure conveying line and the cyclone are heated.

13. A gasification system in accordance with claim 10, wherein said grinding device further comprises at least one mill configured to grind the particulate fuel to a predetermined particle size distribution.

14. A gasification system in accordance with claim 13, wherein said feed preparation section further comprises at least one dryer assembly coupled in flow communication with said at least one mill, said at least one dryer assembly configured to remove moisture from the particulate fuel.

15. A gasification system in accordance with claim 10, wherein said grinding device further comprises a pulverizer configured to reduce a particle size distribution of the particulate fuel; and said feed preparation section further comprises a belt feeder configured to receive a flow of fuel particulate and channel the particulate fuel to said pulverizer.

16. A gasification system in accordance with claim 15, wherein said grinding device of said feed preparation section further comprises a mill coupled in flow communication upstream of said pulverizer and configured to grind the particulate fuel to a predetermined particle size distribution.

17. A system in accordance with claim 10, wherein said pressurization and conveyance section further comprises:
an outlet conduit; and
a feed vessel coupled between said outlet conduit and said at least one solids pump, said feed vessel configured to smooth a flow of the particulate fuel.

18. A gasification system in accordance with claim 17, wherein said outlet conduit comprises a flow of a gas configured to facilitate providing a substantially even distribution of the particulate fuel exiting said at least one solids pump.

\* \* \* \* \*